Nov. 1, 1927. 1,647,808
A. NEUMANN
FILTER
Filed Dec. 6, 1924 2 Sheets-Sheet 1
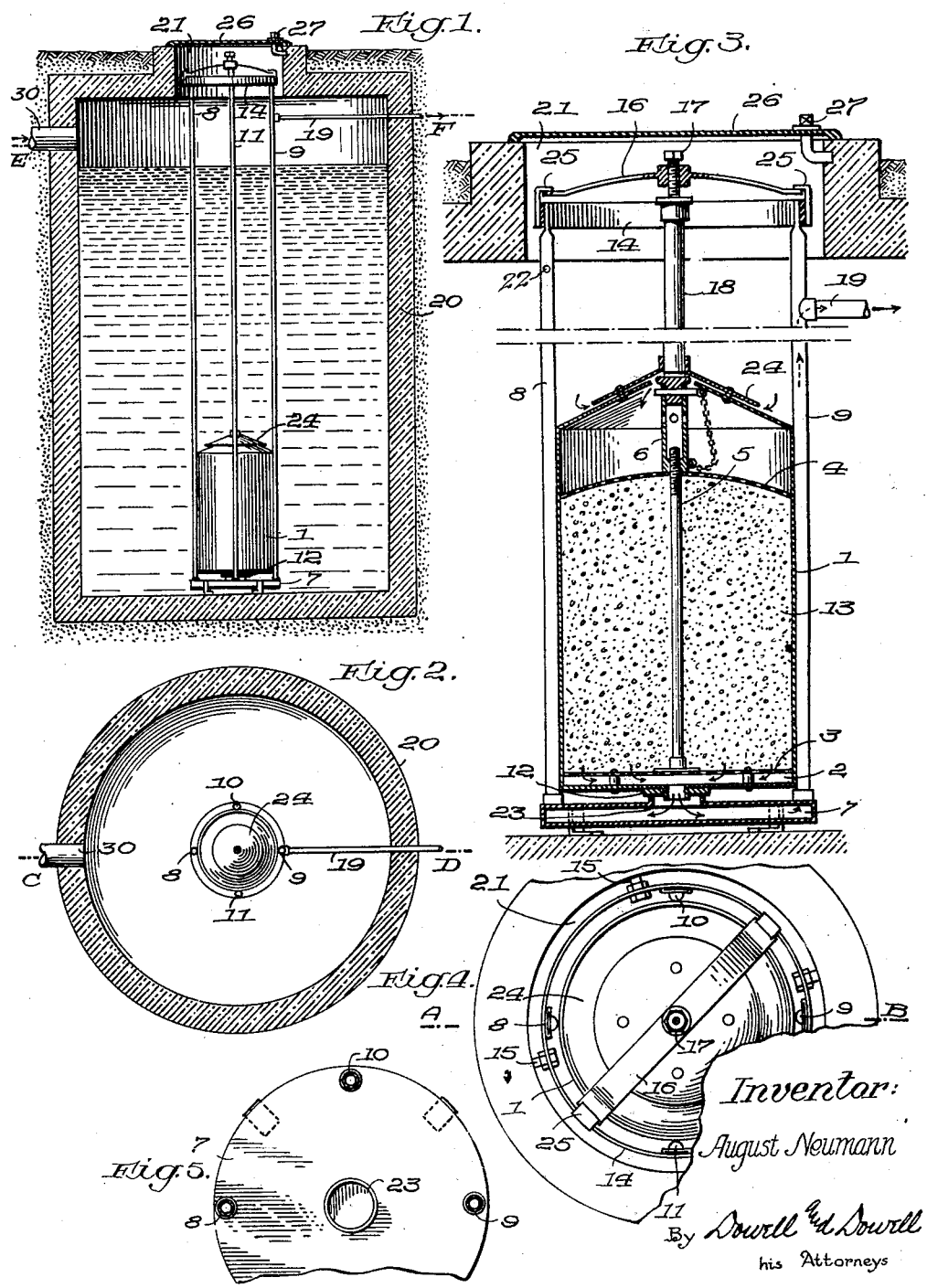
Inventor:
August Neumann
By Dowell and Dowell
his Attorneys

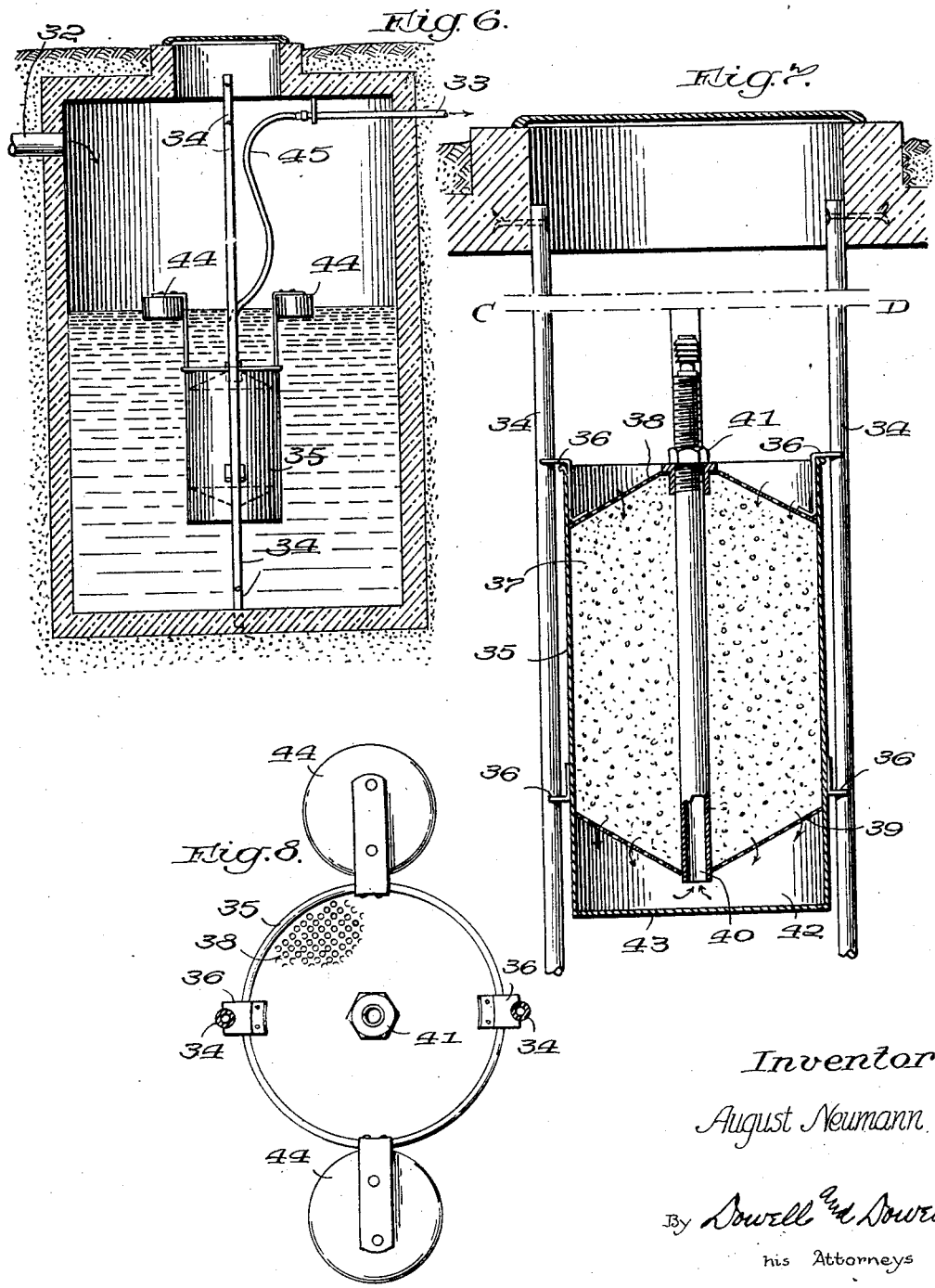

Patented Nov. 1, 1927.

1,647,808

UNITED STATES PATENT OFFICE.

AUGUST NEUMANN, OF REPPEN, GERMANY, ASSIGNOR TO JOHN ASTROM, OF FORT WAYNE, INDIANA.

FILTER.

Application filed December 6, 1924. Serial No. 754,296.

This invention relates in general to filters and more particularly to rain-water filters.

Rain-water which is conducted from roofs to a cistern or tanks generally contains a considerable quantity of impurities, such as street dust, etc. These impurities should be removed before the water is used for washing or bathing purposes and particularly if it is to be used as drinking water. For this reason precipitating agents were generally employed which cause impurities to sink to the bottom of the tank so as to enable clear water to be taken from the top. This method of clarifying the water is coupled with the disadvantage that sludge collects at the bottom of the tank which is stirred up during storms by the rapid inflow of large quantities of water into the tank so that the water in the tank will then contain more impurities than the uncleaned water from the roof.

An object of the present invention is to remove this drawback by inserting a filter of a particular kind in the tank. A feature of the invention is that the filter is arranged to be easily removed for cleaning purposes from the cistern or tank. The actual filtering material itself consists of cork, which in a granulated form is as suitable as gravel for filtering purposes provided that it is compressed so as to form a comparatively dense mass and does not float on the water in the form of loose granules.

The specific weight of cork is .24 so that it is four-times as light as water and therefore if the filter is placed beneath the surface of the water the buoyancy of the cork will tend to lift it to the surface when the device for holding it down is loosened or removed.

Other features of the invention will appear hereinafter. The invention is illustrated in the drawing in which Fig. 1 shows a vertical section (on the line c—d of Fig. 2) of a cistern fitted with a filter according to the invention.

Fig. 2 is a cross section of Fig. 1 on the line e—f of Fig. 1.

Fig. 3 is a vertical elevation on an enlarged scale of the filter arrangement.

Fig. 4 is a top view showing the means for holding down the filter.

Fig. 5 is a top view of the cleaned-water chamber arranged beneath the filter.

Fig. 6 shows a vertical section of a cistern fitted with a modified filter.

Fig. 7 is a vertical elevation on an enlarged scale of the filter in the cistern shown in Fig. 6.

Fig. 8 is a cross section of Fig. 7 on the line c—d viewed from above.

The rain-water or liquid to be filtered enters the cistern, Fig. 1, through a pipe 30 and, after passing through the filter 1, ascends through a pipe or pipes 9 and passes out through a pipe 19.

In the arrangement shown in Fig. 6 the water enters the cistern through a pipe 32 and, after passing downwards through the filter, ascends and passes out through a pipe 33 to the places where it is used.

Referring to Figs. 1–5 the actual filter consists of a thin-walled receptacle 1 having a bottom 2. The filtering material 13 which consists of cork, preferably granulated, is compressed between two perforated plates 3 and 4, the bottom plate 3 being connected to the top perforated plate 4 by a rod 5, whose bottom end is fixed to the plate 3 and whose top end is threaded and provided with a nut 6 by which the plate 4 can be screwed down so as to compress the cork. The bottom perforated wall 3 is supported a short distance above the bottom 2 of the receptacle 1. Arranged beneath the bottom 2 of the receptacle is a chamber 7 for cleaned or purified water, the top of this receptacle being shown in Fig. 5. Four hollow guide rods 8, 9, 10, 11 connect the chamber 7 to a top ring 14 arranged in the top opening of the cistern. The top ring 14 is held in position by horizontal screws 15, Fig. 4. A pressure rod 18 and a horizontal bar 16, whose ends engage with holding members 25, are provided for pressing the receptacle 1 down onto the chamber 7 which has a central short upwardly extending neck 23. A packing rig 12 is inserted between the bottom 2 of the receptacle 1 and the neck 23. A screw 17 is provided for tightening down the receptacle 1 on the chamber 7 so as to effect a water-tight joint at 23.

The cistern may be closed by a lid 26 which is held down by fastening members 27.

The parts are assembled in the following manner: Granulated cork 13 is put into the receptacle 1 and compressed between the perforated walls 3 and 4 by means of a rod 5 and a screw 6 so as to form a cork body which does not float and enables the water to be filtered to pass through it downwardly. The guide rods 8, 9, 10, 11 are now fixed on the clean water chamber 7 and attached to the top guide ring 14. The chamber 7 with the attached rods 8, 9, 10, 11 and ring 14 is now inserted in the cistern 20 through the top opening 21 of the latter and the guide ring 14 is then fixed by means of the screws 15. The entire structure is thus locked in position. The filter receptacle 1 is now lowered into the cistern 20 by means of the rod 18, the lowering operation being carried out slowly to enable the air to escape from the granulated cork body. Pressure is now applied to the pressure rod 18 by means of the screw 17 of the cross bar 16 whose ends are made to engage with the holding members 25. By the downward pressure on the rod 18 a tight joint is effected with the aid of the packing ring 12 between the central portion of the bottom 2 of the receptacle 1 and the short upwardly extending neck 23 of the clean water chamber 7. The downward pressure may of course be exerted by other means than the pressure screw 17 such as weights, springs, levers etc. As the guide rods 8, 9, 10, 11 are tubes the suction pipe of the house pump may be connected to any of the tubes, for example 9, as these tubes are all connected to the chamber 7. The tubes to which the suction pipe 19 is not connected may be provided at the top with a small hole 22 for the ventilation of the chamber 7 during the filtration period.

The filter is now ready for use. The impure water can flow downwardly through the cork 13 and in so doing it is mechanically cleaned in practically the same manner as in any gravel or sand filter. The filtered water collects in the chamber 7, whence it is drawn out through a suction pipe 19 and forced into the clean water pipes of the house. When the granulated cork body is clogged with dirt and has to be cleaned the filter receptacle is raised out of the cistern. When the cross bar 16 is removed the receptacle 1 with the filter body can easily be lifted by means of the rod 18 because the buoyancy of the cork 13 tends to raise the receptacle, thus making it very light. When the receptacle 1 has thus been removed from the cistern the top perforated wall 4 is taken out and the granulated cork 13 can now be thoroughly cleaned by washing it in any suitable vessel. If necessary, the granulated cork can be washed in hot water so as to destroy all bacteria. When the filtering material has thus been cleaned it is replaced in the receptacle 1 and the filter is then ready for renewed use.

A hood 24 is provided at the top of the receptacle for the purpose of diverting impurities from the top surface of the cork filter whenever a sudden rush of large quantities of dirt occurs.

The modified arrangement shown in Figs. 6, 7 and 8 comprises vertical guide rods 34 fixed in the cistern, and a receptacle 35 with lateral guide members 36 adapted to slide along the guide rods 34. The receptacle contains a filtering body consisting of granulated cork 37 compressed between perforated walls 38, 39 by means of a hollow rod 40 provided at its top end with a screw nut 41. The arrangement is such that a space 42 which operates as a clean water chamber is formed between the bottom-perforated wall 39 and the bottom 43 of the receptacle 35. The receptacle 35 is provided with floats 44 which hold the receptacle suspended at a certain distance from the surface of the water to be filtered. The weight of the receptacle 35 and its contents is arranged so that it almost remains suspended beneath the surface of the water but has a tendency to sink slowly to the bottom. The floats 44, however, prevent it from sinking and hold it suspended at a slight distance from the surface of the water. The central pipe 40 is connected by a suitable tube 35 to the suction pipe through which the cleaned water is drawn from the chamber 42 into the pipe 33 whence it is forced into the clean water pipes of the house.

I claim:—

1. A submergible filter for cisterns comprising a receptacle containing upper and lower perforated plates and a body of granulated cork compressed between said plates so as to prevent it from floating on the surface of the liquid, but adapting it to be easily submerged and raised, the lower plate being spaced from the bottom of said receptacle so as to provide a cleaned water space, and one of said plates being movable toward the other, a hollow rod connecting the two plates and having adjustable means thereon for drawing them toward each other and compressing the granulated cork therebetween, said rod serving as water conducting means connecting said water space with a suction or service pipe leading from the cistern, and means within the cistern for guiding said receptacle as it is raised and lowered and holding it in alinement with an opening in the top of the cistern through which the receptacle is inserted and withdrawn.

2. A submergible filter for cisterns comprising a receptacle containing upper and lower perforated plates and a body of granulated cork compressed between said plates so as to prevent it from floating on the surface of the liquid, but adapting it to be easily submerged and raised, the lower plate being spaced from the bottom of said receptacle so as to provide a cleaned water space and one of said plates being movable toward the other, a hollow rod connecting the two plates and having adjustable means thereon for drawing them toward each other and compressing the granulated cork therebetween; said rod serving as water conducting means connecting said water space with a suction or service pipe leading from the cistern, and means for centering and guiding and maintaining the receptacle in a centrally disposed position within the cistern when it is being inserted or removed therefrom.

3. A submergible filter for cisterns comprising a receptacle containing upper and lower perforated plates and a body of granulated cork compressed between said plates so as to prevent it from floating on the surface of the liquid, but adapting it to be easily submerged and raised, the lower plate being spaced from the bottom of said receptacle so as to provide a cleaned water space and one of said plates being movable toward the other, and a hollow rod connecting said water space with a flexible tube above the filter for connection with a suction or service pipe leading from the cistern; said rod also connecting the two perforated plates and having adjustable means thereon for drawing them toward each other and compressing the granulated cork therebetween, and vertical rods within the cistern for guiding and holding said receptacle in alinement with an opening in the top of the cistern through which the receptacle is inserted and withdrawn.

4. A submergible filter for cisterns comprising a receptacle containing upper and lower perforated plates and a body of granulated cork compressed between said plates so as to prevent it from floating on the surface of the liquid, but adapting it to be easily submerged and raised, the lower plate being spaced from the bottom of said receptacle so as to provide a cleaned water space and one of said plates being movable toward the other, a hollow rod connecting said water space with a flexible tube above the filter for connection with a suction or service pipe leading from the cistern; said rod also connecting the two perforated plates and having adjustable means thereon for drawing them toward each other and compressing the granulated cork therebetween, a float carried by said receptacle for holding it suspended below the surface of the water and above the bottom of the cistern, and means for guiding the receptacle as it is raised or lowered and holding it in a centrally disposed position in alinement with the opening in the top of the cistern through which it is inserted and removed.

5. The combination with a cistern of a cork filtering body compressed sufficiently to adapt it to sink beneath the surface of the water in the cistern, means for compressing the cork body, a receptacle for the compressed cork body having a chamber for filtered water at its bottom, means for holding the receptacle beneath the surface of the liquid to be filtered, guide rods in the cistern for guiding said receptacle as it is being raised and lowered and holding it in alinement with the opening in the top of the cistern through which it is inserted and removed from the cistern, and means for conducting said liquid in a downward direction through the filtering body into said chamber and therefrom upward to a pipe for drawing the filtered water from said chamber.

6. The combination with a cistern, of a submergible filter comprising a receptacle having a closed bottom and perforated partitions therein spaced apart and one of them spaced from said bottom so as to provide a chamber for filtered water between the last named partition and said bottom; one partition being movable toward the other, a compressible body of light granulated filtering material between said partitions adapting the receptacle to be easily raised and lowered within the water and held suspended therein, a discharge pipe extending from said chamber through said material and connecting said partitions; said pipe having means associated therewith for compressing said filtering material between said partitions, means for guiding the receptacle as it is being raised or lowered and holding it in a centrally disposed position in alinement with the opening in the top of the cistern through which it is inserted and removed, and a float for holding said receptacle suspended below the surface of the water in which it is submerged.

7. The combination with a cistern, of a submergible filter comprising a receptacle having perforated walls or partitions therein spaced apart and one of them spaced from the bottom of the receptacle so as to provide a chamber for filtered water between the last named partition and said bottom, and one partition being movably fitted within the receptacle, filtering material between said partitions consisting of granulated cork compressed sufficiently to prevent the receptacle from floating upon the surface of the water, a float for holding the receptacle suspended below the surface of the water, and adjustable means including a hollow rod connecting said partitions so that the movable one may be drawn toward the other for compressing said granulated material therebetween, said rod serving as means for conducting the filtered water from said chamber and a flexible tube connecting the upper end of said rod with a service pipe leading from the cistern together with means for guiding the receptacle as it is being raised or lowered and holding it in a centrally disposed position in alinement with the opening in the top of the cistern through which it is inserted and removed.

8. A submergible filter for cisterns comprising a receptacle having an imperforate bottom and upper and lower perforated plates therein, one of which is movable toward the other; the lower plate being spaced from said bottom so as to provide a clean water space, a body of compressible filtering material between said plates, a hollow rod connecting said plates and means thereon for adjusting one plate toward the other plate and compressing the filtering material therebetween, a flexible tube connected at one end with said hollow rod and at the other end with a suction or service pipe leading from the cistern, means for guiding said receptacle as it is lowered within the cistern or raised, and a float for suspending the filter below the surface of the liquid in the cistern.

9. The combination with a cistern of a receptacle closed at the bottom and open at the top and having a chamber for filtered water at its bottom, a cork filtering body in the receptacle, two perforated plates spaced apart within said receptacle for confining the filtering body therebetween, one plate being movable toward the other, a hollow rod connecting said partitions and means thereon co-operating therewith for compressing the cork body between said plates, guides in the cistern for guiding said receptacle with its contents when it is inserted and removed from the cistern, and means for conducting the liquid to be filtered in a downward direction through the cork body and perforated plates and in an upward direction through said hollow rod, and floats attached to said receptacle overhead on opposite sides thereof, whereby the receptacle with its contents is balanced so that it is held with respect to its buoyancy suspended a short distance beneath the surface of the liquid.

In testimony whereof I have affixed my signature.

AUGUST NEUMANN.